E. H. DODGE.
Stove-Pipe.
No. 214,761. Patented April 29, 1879.
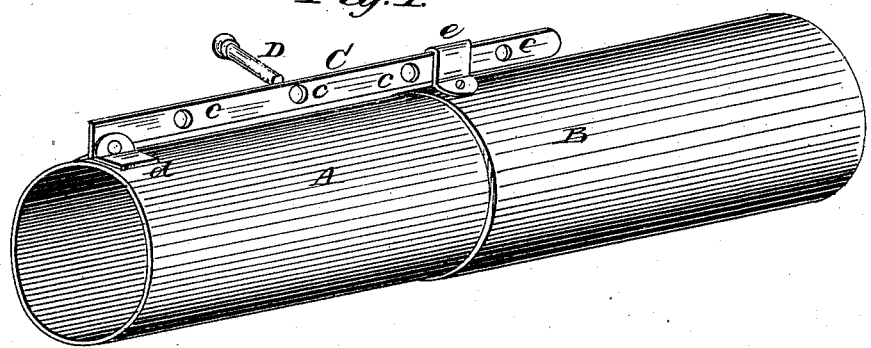
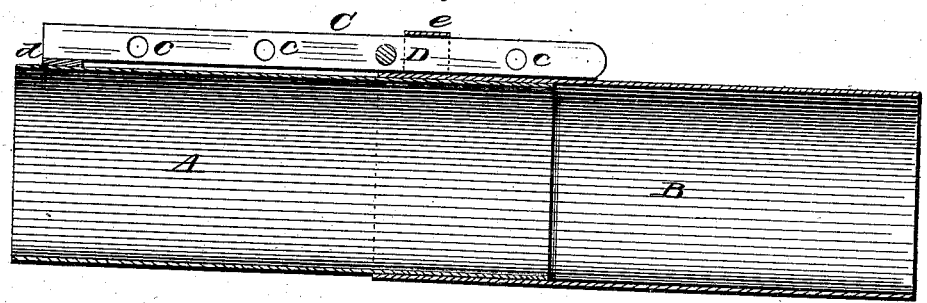
Witnesses
Fred G. Dieterich
George Binkenburg
Inventor
Edmund H. Dodge
By Myers &
Att'ys

UNITED STATES PATENT OFFICE.

EDMUND H. DODGE, OF CALEDONIA, OHIO.

IMPROVEMENT IN STOVE-PIPES.

Specification forming part of Letters Patent No. 214,761, dated April 29, 1879; application filed September 18, 1878.

*To all whom it may concern:*

Be it known that I, E. H. DODGE, of Caledonia, in the county of Marion and State of Ohio, have invented certain new and useful Improvements in Stove-Pipes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a longitudinal view, in perspective, of my invention. Fig. 2 is a longitudinal sectional view thereof.

My invention relates to an improvement in stove-pipes; and consists in the slip-joint B, the inside joint, A, the extension-rod C, with orifices $c\,c$, and pin D, secured by rivet $d$ and loop $e$, and the combination and arrangement of the parts, as hereinafter more specifically set forth.

A indicates an inside link or joint of a stove-pipe, to which is riveted or soldered the rivet or brace $d$, which, in like manner, is riveted or soldered to the extension-rod C. B marks an outer joint or link of a stove-pipe, which has rigidly secured thereto the loop $e$, for reception of the extension-rod C. C is an extension-rod, riveted, as aforesaid, to link A, and provided with the orifices $c\,c$ and the supporting-pin D, which latter is inserted in one of said orifices, and adjusts the pipe by means of loop $e$, against which it is caused to rest, to such length as may be desirable in connection with its intended purpose.

Where the exact length of the required link or joint is determined by measurement or otherwise, the rod C is inserted in loop $e$, and by means of pin D it is adjusted to the proper length.

I am aware that a thumb-screw has been employed, in connection with a slotted bar, for adjusting stove-pipe links to such lengths as may be desired, as shown in the patent to Samuel Johnson of March 18, 1873, No. 136,922, which I disclaim; but my invention differs therefrom in its construction and operation, and presents manifold advantages over the invention cited. It is not so complicated, and can therefore be more readily and cheaply constructed; besides which the pressure of the thumb-screw requisite to operate the invention referred to must be such as to produce sufficient friction to sustain the weight of the vertical links of the stove-pipe thereby secured, and the amount of friction must vary with the contraction and expansion of the metal, and necessitate a periodical tightening of the thumb-screw.

I claim—

The link or joint A, with connecting-rod C, rigidly attached thereto by means of rivet or brace $d$, the connecting-rod having horizontal orifices $c\,c$, and detachable and adjustable pin D, in combination with link or joint B, having loop $e$, substantially as shown and described.

In testimony that I claim the foregoing as my own I affix my signature in presence of two witnesses.

E. H. DODGE.

Witnesses:
J. BLANCHARD,
F. W. BROOKE.